(12) United States Patent
Large

(10) Patent No.: US 8,031,408 B2
(45) Date of Patent: Oct. 4, 2011

(54) FLUID DISPLACEMENT MECHANISM

(75) Inventor: Timothy A. Large, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 12/098,957

(22) Filed: Apr. 7, 2008

(65) Prior Publication Data

US 2008/0257435 A1    Oct. 23, 2008

(30) Foreign Application Priority Data

Apr. 5, 2007  (GB) .................................. 0706748.1

(51) Int. Cl.
*G02B 1/06* (2006.01)

(52) U.S. Cl. ........................................................ 359/666

(58) Field of Classification Search ................... 359/665, 359/666

See application file for complete search history.

(56) References Cited

U.S. PATENT DOCUMENTS

2008/0259463 A1* 10/2008 Shepherd ...................... 359/666

FOREIGN PATENT DOCUMENTS

WO    WO 2005/073779 A1    8/2005

OTHER PUBLICATIONS

Search Report from the UK Intellectual Property Office regarding Application No. GB0806220.0 dated Jun. 13, 2008.
Examination Report from the UK Intellectual Property Office regarding Application No. GB0806220.0 dated Jul. 1, 2009.
Notification of Grant from the UK Intellectual Property Office regarding Application No. GB0806220.0 dated Mar. 30, 2010.

* cited by examiner

*Primary Examiner* — Joseph P Martinez

(57) ABSTRACT

A fluid displacement mechanism is disclosed. In an embodiment, first and second cavities are separated by a flexible membrane. The first cavity contains a non-conductive fluid and the second cavity contains a conductive fluid. First and second electrodes are positioned in the first and second cavities respectively such that the application of a voltage between the electrodes causes movement of the membrane by the build up of an electrostatic charge between the membrane and first electrode.

20 Claims, 7 Drawing Sheets

FLUID DISPLACEMENT MECHANISM

CROSS-REFERENCE TO RELATED APPLICATION

This patent application claims priority from UK Patent Application number 0706748.1 filed Apr. 5, 2007.

BACKGROUND

This invention relates to the manipulation of fluids, and particularly the manipulation of fluids using electrostatic forces.

A mechanism which allows direct electrical control of fluid movement may be useful in a range of devices, for example, in adaptive optical devices, drug delivery pumps, and biochemical assays. In such applications it is necessary to move small amounts of fluid in a controlled manner. Adaptive optical devices using two immiscible fluids are known, but mixing of the fluids is a disadvantage and may limit applications.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A fluid displacement mechanism is disclosed. In an embodiment, first and second cavities are separated by a flexible membrane. The first cavity contains an non-conductive fluid and the second cavity contains a conductive fluid. First and second electrodes are positioned in the first and second cavities respectively such that the application of a voltage between the electrodes causes movement of the membrane by the build up of an electrostatic charge between the membrane and first electrode.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
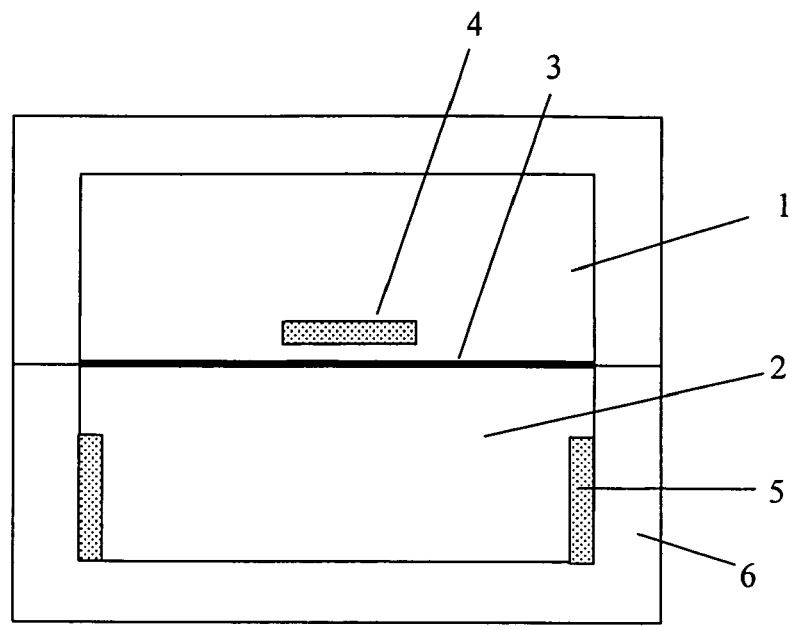
FIG. 1 shows a schematic diagram of an example device described herein.

FIG. 1 shows a schematic diagram of a fluid displacement device. The device comprises two reservoirs 1, 2 separated by a thin, flexible, membrane 3. The membrane may be formed of a plastic such as PET or a silicone rubber.

A first electrode structure 4 is immersed in a non-conductive fluid such as a siloxane or a hydrocarbon contained in the first reservoir 1, and is in close proximity to the membrane. A conductive fluid, such as brine, is contained in the second reservoir 2. The second electrode 5 is mounted in the wall of the reservoir 6, such that it is in electrical contact with the conductive fluid. The second electrode provides electrical contact to the conductive fluid, but need not be in proximity to the membrane, and may therefore be located in any convenient position.

The first electrode 4 allows fluid to flow around it, and/or through it such that movement of the first fluid in the first cavity is not significantly restricted by the presence of the electrode. The membrane is in close proximity (typically a few tens of microns) to the membrane. The reservoirs by comparison are typically more than a factor of ten greater in size in the plane of the membrane than the electrode-membrane spacing.

A voltage applied between the first and second electrodes 4, 5 causes a current to flow through the conductive fluid 2. A charge builds up on the membrane 3 and an equal and opposite charge builds up on the first electrode 4, exerting an electrostatic pressure on the membrane. This forces the membrane to distort in such a way that the gap between the first electrode and the membrane is reduced causing movement of the first and second fluids.

The position of the membrane, and hence shape of the cavities, is thus controlled by the applied voltage. By appropriate configuration the device can be adapted to provide inter alia a variable focus optical device, and a fluid pump.

An application of the invention is in correction of focus in dynamic optical systems. For example, the correction of eyesight, or the adjustment of focus in electronic systems such as security and image processing cameras, automotive sensors, and mobile phones.

Figure 2:
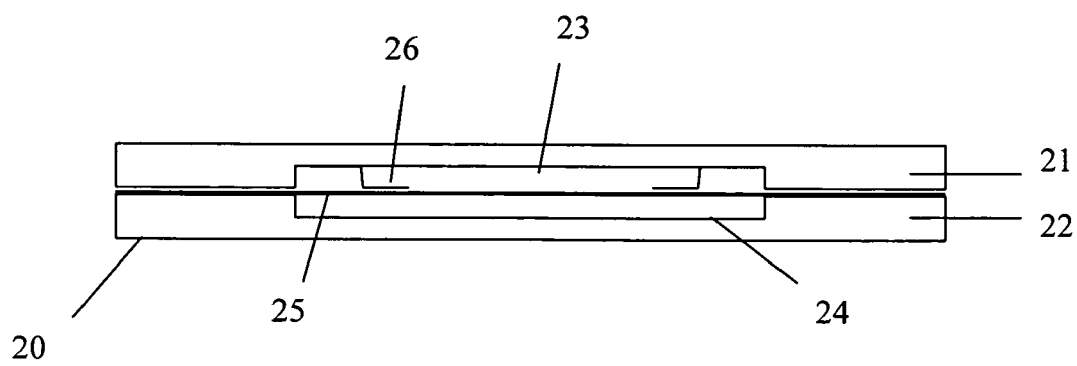
FIG. 2 shows an optical device having variable optical power.

FIG. 2 shows a variable focus optical device 20. A first part 21 and a second part 22 define a cavity which is separated into first 23 and second 24 cavities by a thin flexible membrane 25. A ring electrode 26 is provided in close proximity to membrane 25. The parts are circular in the plane perpendicular to FIG. 5.

The first cavity 23 is filled with a non-conductive fluid (for example, a liquid hydrocarbon or silicone oil) and the second cavity 24 is filled with a conductive fluid (for example, brine). The cavities are sealed such that the fluids are retained within the cavities and there is no interchange of the fluids.

When a voltage is applied between the electrodes, charge moves through the conductive fluid and consequently an electric field is developed between the membrane and the top electrode (which is insulated from the membrane by the non-conductive fluid). This electrostatic field applies an electrostatic force to the membrane, causing movement of the membrane adjacent to the electrode towards the electrode.

Movement of the membrane pushes fluid in the first cavity away from the electrode region. The fluid that is moved out of the electrode region is accommodated by the membrane moving away from the first cavity in the central region. The height of the first cavity is thus increased in the central region and decreased in the electrode region. The opposite fluid movement occurs in the second cavity, where fluid moves away from the centre and towards the electrode region. The first electrode is a ring and so in the plane perpendicular to FIG. 2 the electrode region is a circle and the central region is the area within that circle. The total volume of the first and second cavities remains constant but the distribution of fluid in those cavities, and hence position of the membrane, is varied as a voltage is applied between the electrodes.

As is explained in detail below, the shape of the membrane in the central region is defined by a balance of the forces applied by the electrostatic attraction and by the fluids, which results in the central region forming a substantially spherical shape. If the fluids in the first and second cavities have different refractive indices, a spherical lens is thus formed in the central region of the device. The movement of the membrane, and hence the curvature and power of the lens formed, is dependent on the charge formed on the membrane.

Figure 3:
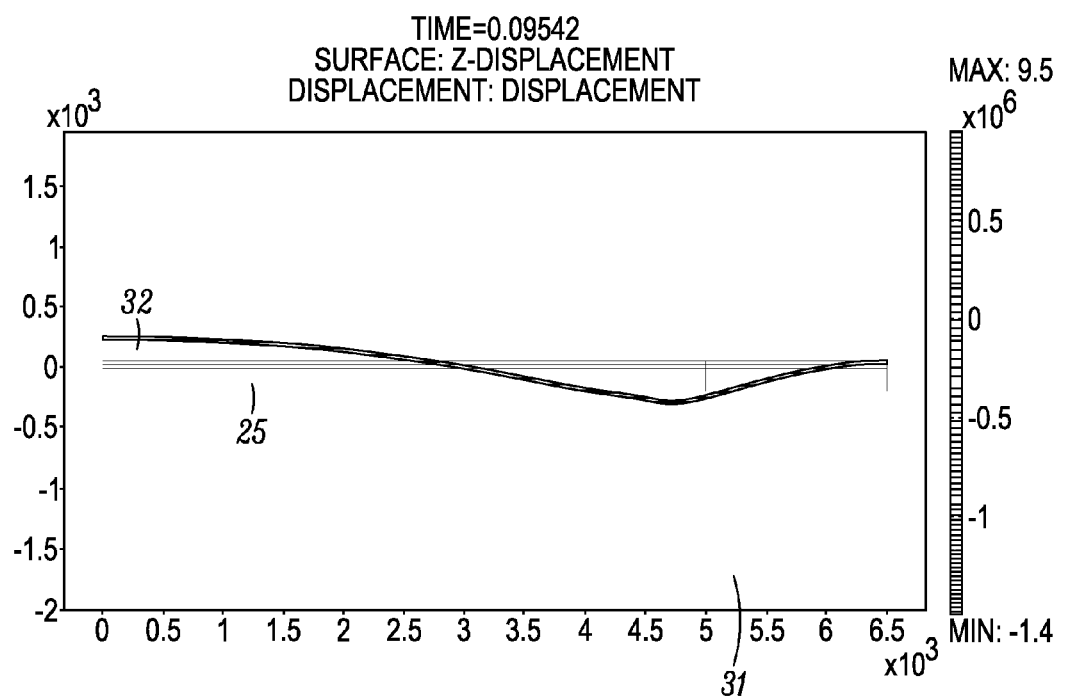
FIG. 3 shows a chart of membrane deflection.

FIG. 3 shows a finite element plot of a membrane 25 when a voltage is applied between the electrodes. The device modelled in FIG. 3 is a cylindrical device, with the axis of the device being located at the left-hand end of the figure. The first cavity of the device (containing the non-conductive fluid and ring electrode) is located below the membrane 25, and the second cavity (containing the conductive fluid) is located above the membrane 25. The modelled device is thus inverted compared to that shown in FIGS. 1 and 2. The ring electrode is located in region 31, and the membrane has been distorted towards that electrode by the voltage applied between the electrodes (the other electrodes are not shown, but are positioned to contact with the fluid in the second cavity above the membrane). In the central region of the membrane 32 the membrane has been distorted in the opposite direction by the action of the fluid displaced from region 31 on the membrane.

Figure 4:
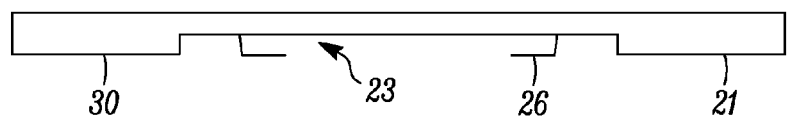
FIG. 4 shows a first part of the device of FIG. 2.

FIG. 4 shows the first part 21 of the device of FIG. 2 in cross-section. The part is formed of a substantially rigid and transparent material with a depression 30 that will form the first cavity 23 of the device. A ring electrode 26 is mounted on the first part such that when the device is constructed it will be in close proximity to, but not touching, the membrane. The electrode 26 is formed in such a way that fluid may flow around it, from the centre to the outside, and vice-versa.

Figure 5:
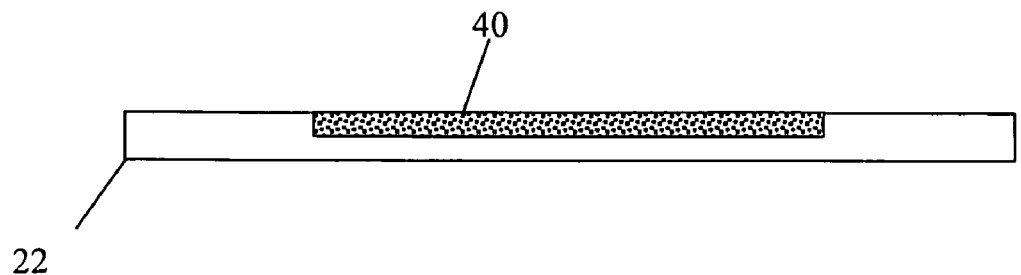
FIG. 5 shows a second part of the device of FIG. 2.

FIG. 5 shows a cross-section of the second part 22. The part is formed of a substantially rigid and transparent material with a depression 40 that will form the second cavity.

Figure 6:
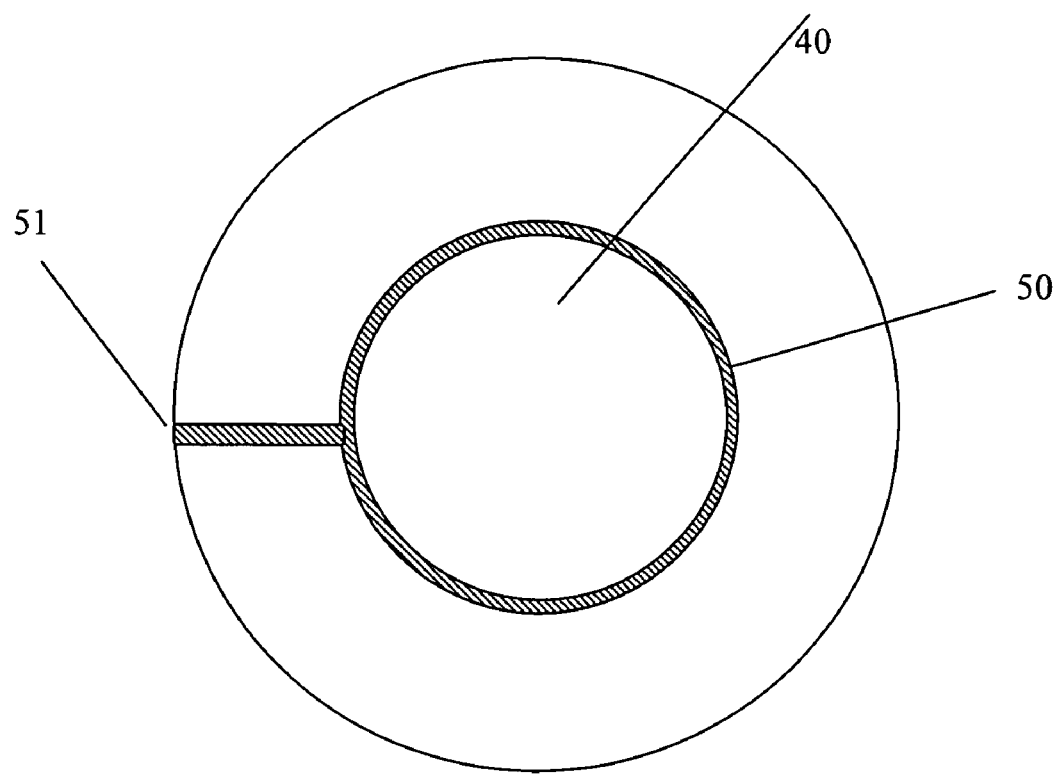
FIG. 6 shows a plan view of the second part shown in FIG. 5.

FIG. 6 shows a top-view of the second part 22. An electrode 50 is coated on the internal surface of depression 40 such that electrical contact to fluid contained in depression 40 is provided. The electrode may be sputter coated onto the part. A spur 51 is provided extending from electrode to the edge of the part such that external contact can be made to the electrode. If a transparent electrode material is utilized the electrode may be deposited in the optically usable area of the device. The electrode 50 shown in FIG. 6 is annular, but the shape of the second electrode is not critical in the definition of the membrane shape and therefore the second electrode can be any convenient shape. Also, the shape of the second electrode need not match that of the first electrode.

The example shown above utilizes a ring-shaped first electrode, but other shapes and forms are equally applicable such that different membrane shapes can be defined. Furthermore, multiple independent first electrodes formed as annuli may be used to allow a near-continuous change in optical power. Such electrodes may be driven in sequence, outer annulus first, then proceeding to the inner annulus such that the curvature, and therefore optical power, of the central zone of the device is increased in steps. The shape and position of the first electrode defines the shape of the membrane and hence the optical properties of the device.

The power of the lens formed is dependent upon the difference in refractive index between the two fluids. Fluids having a refractive index in the range 1.3 to 2.3 are commercially available which allow the construction of lenses of useful optical power.

If the two fluids have different densities, the position of the membrane may change as the orientation of the device is changed due to forces exerted on the membrane by each fluid changing. This can be prevented by utilizing fluids having the same density, such that there is no change in the forces on the membrane as the orientation of the device changes.

Figure 7:
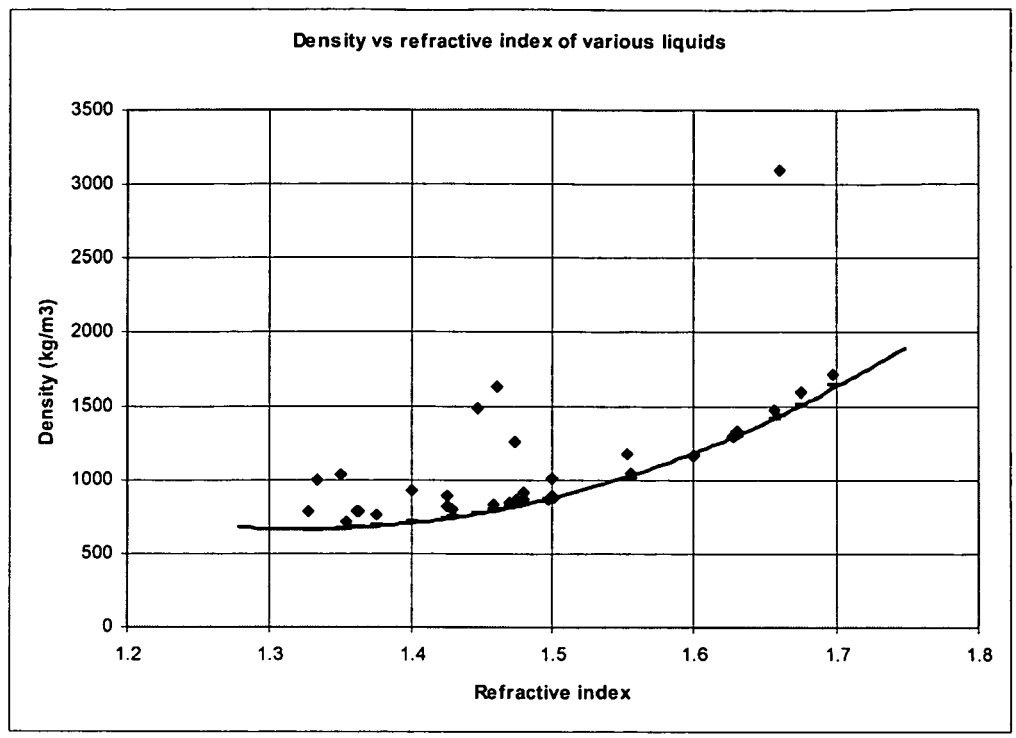
FIG. 7 shows a chart of density versus refractive index.

FIG. 7 shows a graph of density against refractive index for a range of commercially available fluids. Based on common commercially available fluids it is possible to achieve a refractive index difference of approximately 0.25 using two fluids with the same densities.

Deformation of the membrane, and hence a change in the power of the lens, depends on the movement of fluid in the two cavities and is thus dependent upon the viscosity of those fluids. The lower the viscosity, the less resistance there is to movement, and hence the faster the lens will respond to changes in voltage. Movement of the first fluid, and hence of the membrane, is also resisted by the first electrode. An open structure that does not restrict fluid flow allows faster movement and hence faster changing of the optical power of the lens.

Figure 8:
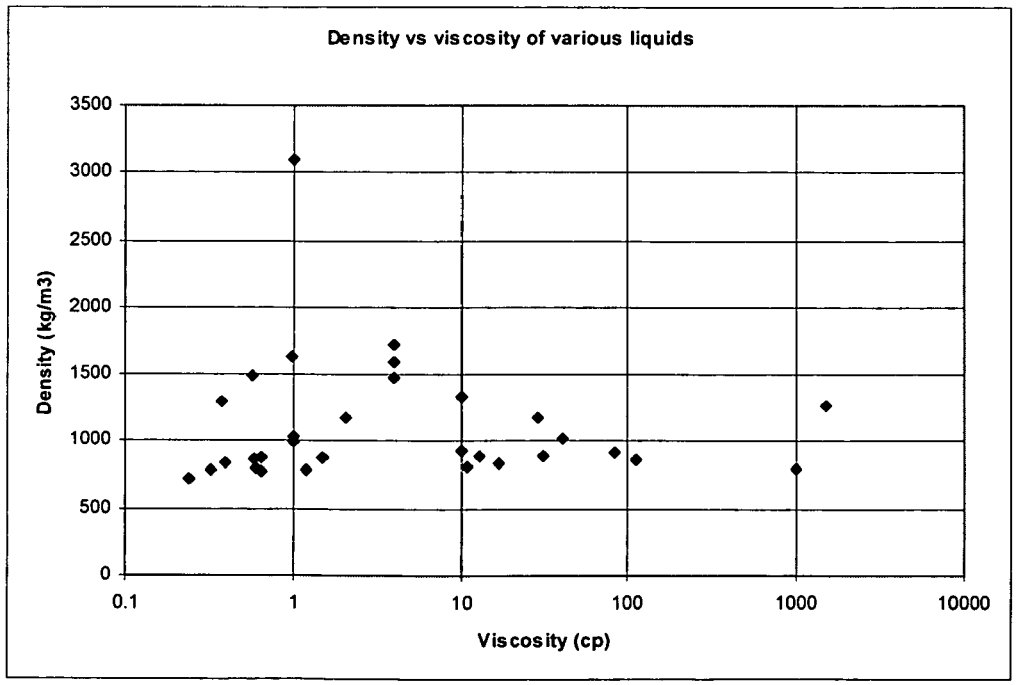
FIG. 8 shows a chart of density versus viscosity.

FIG. 8 shows a graph of density against viscosity, which indicates no correlation of the two parameters. This indicates that liquids having low viscosities and differing refractive indices may be found for use in the two cavities. An example of a pair of fluids that may be used are brine for the conductive fluid, and trimethyl pentaphenyl trisiloxane for the non-conductive fluid. These fluids have a refractive index difference of 0.23, and the same density.

In order to reduce electrolysis of the first and second fluids due to continued application of a voltage between the electrodes, the voltage may be periodically reversed. If that reversal is performed sufficiently quickly, the membrane will not respond and hence there will be no effect on optical performance.

Figure 9:
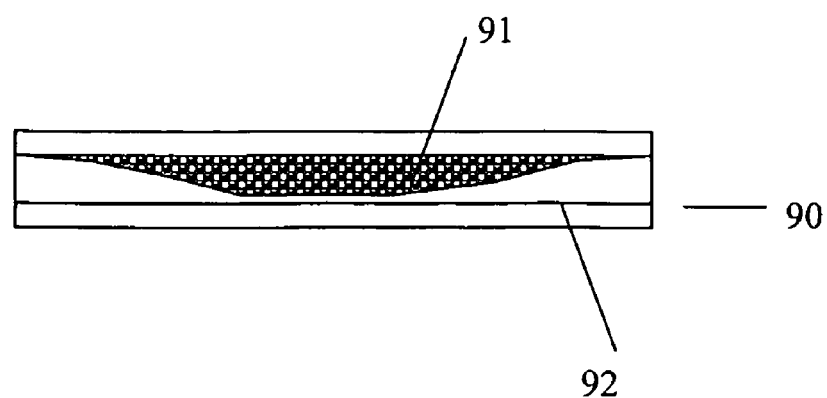
FIG. 9 shows an optical attenuator.

FIG. 9 shows a variable optical attenuator 90 utilizing the principles of construction and operation described in relation to the lens of FIG. 2 to 5. The attenuator 90 of FIG. 9 has a first cavity 91 and a second cavity 92, each containing a fluid. In the example shown in FIG. 9, the membrane is not located in the centre of the cavities, as in the example shown previously, but is offset from that centre. This causes the two cavities to be unequal shapes, but all principles of operation remain the same. A device with the membrane centrally located is equally applicable and likewise a device with a non-central membrane is suitable for use as a variable focus lens.

The fluid in the first cavity 91 is selected to attenuate certain, or all, wavelengths, depending on the required function. The attenuation caused by the first fluid is dependent upon the optical path length of light passing through that fluid. As a voltage is applied to the device between the electrodes (not shown in FIG. 9), the distribution of fluid is changed such that the first fluid moves to the centre of the first cavity, and thus the optical path length of light through the first fluid is the centre of the device is increased. Accordingly, the attenuation caused by the first fluid is increased and so the attenuation of the device is dependent upon applied voltage.

The two fluids in the device of FIG. 9 may be selected to have the same refractive index and thus the refractive properties of the device are not changed as the voltage is varied. Alternatively, fluids having different refractive indices may be selected such that both the attenuation and the refraction of the device are changed.

The first fluid may be selected to attenuate all wavelengths by the same amount, or may be selected to attenuate only certain wavelengths thus forming an optical filter.

Figure 10:
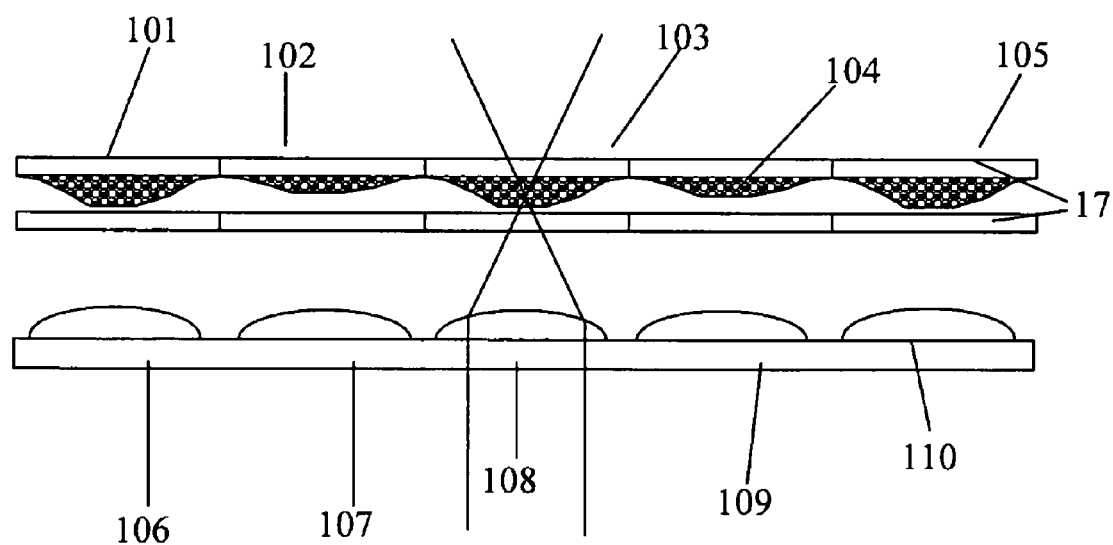
FIG. 10 shows an array of optical attenuators in a display device.

FIG. 10 shows an example of the attenuator of FIG. 9 in a display. An array 100 of attenuators 101, 102, 103, 104, 105 is provided, with each attenuator corresponding to a pixel of a display. Light for each pixel is focussed through the relative attenuator by a respective focusing element 106, 107, 108, 109, 110. The light incoming to the focusing elements may be from any suitable form of lightsource or display. The attenuation of the light for each pixel, and hence the intensity of that pixel, is set by the voltage applied to the respective attenuator. The appearance of the display is therefore controlled by the array of attenuators. In FIG. 10, attenuators 102, 104 are shown in a position having low attenuation, resulting in high brightness of those pixels, whereas attenuators 101, 103 and 105 are shown in a position having high attenuation, resulting in low brightness of those pixels.

In any of the devices described herein, one of the cavity walls may be formed as a mirror rather than as a transparent wall such that the device operates in a reflective manner. Light is arranged to enter the device through the transparent wall, passes through the cavities and membrane, and is reflected off the mirror to pass back through the device and out of the transparent wall. A focusable mirror or mirror with variable attenuation is thus provided. If both of the walls are provided with partial mirrors an optical cavity is formed whose optical path length (due to the first and second fluids having different refractive indices) or attenuation is defined by the position of membrane, and hence by applied voltage. Such a tunable cavity may be used as a tunable optical filter, optical switch or an adjustable laser cavity.

Figure 11:
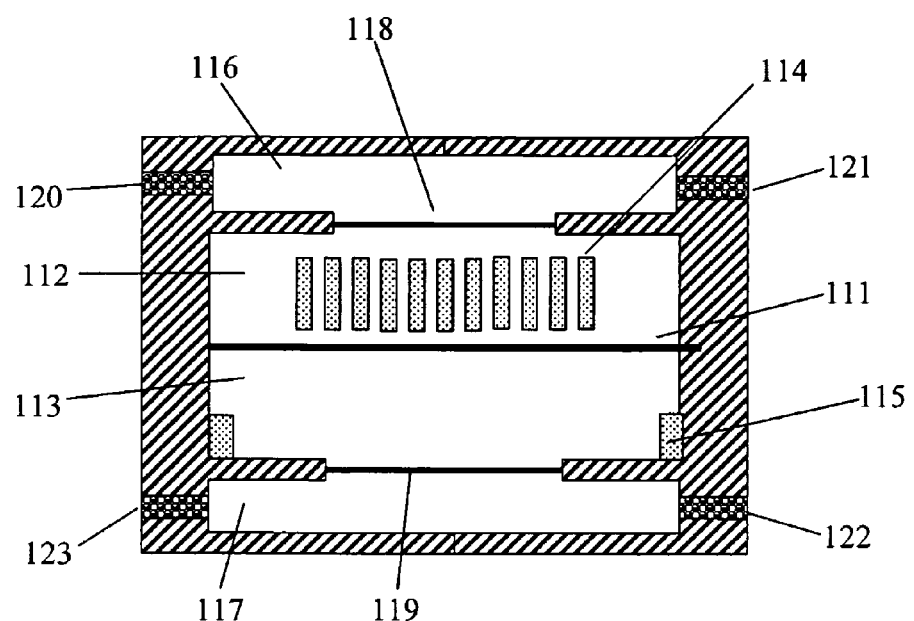
FIG. 11 shows a device having 4 chambers.

FIG. 11 shows a fluid pump utilizing the principles described above. A first membrane 111 is located between first and second cavities 112, 113. A first electrode 114 is provided such that it is adjacent to a significant proportion of the first membrane, and thus a significant proportion of the area of the membrane is pulled towards the electrode when a voltage is applied. A second electrode 115 is provided as in the previously described devices. Third and fourth cavities 116, 117 are provided and are separated from the first and second cavities 112, 113 by second and third flexible membranes 118, 119 respectively.

The first and second cavities 112, 113 are filled with incompressible fluids such that movement of the first membrane 111 is translated to movement of the second and third membranes 118, 119 via those fluids. Movement of the first membrane 111 caused by the application of a voltage between the electrodes 114, 115 therefore causes a change in volume of the third and fourth cavities.

Openings 120, 121, 122, 123 allow fluid to flow into and out of the third and fourth cavities and may be provided with one way valves such that fluid can only flow into particular cavity via one opening, and out of that cavity via the other opening. The device can thus be operated to pump fluid by alternately applying and removing a voltage between the electrodes to cause oscillation of the first membrane 111 and hence a cyclical change in volume of the third and fourth cavities. For example, opening 121 may only allow fluid to flow into chamber 116 and opening 120 may only allow fluid to flow out of chamber 116. When a voltage is applied between the electrodes, the first membrane 111 moves upwards, thus forcing membrane 118 upwards to reduce the volume of cavity 116 and expel fluid through outlet opening 120. When the voltage is removed, the membrane 111 returns to its natural position under its own tension force, and thereby draws fluid into cavity 116 via inlet opening 121. This cycle can then be repeated. The cavity 117 operates out of phase with cavity 116 and therefore a continuous, pulsed, fluid flow may be provided by appropriate connection of the openings and cycling of the applied voltage.

In further examples, one of the third or fourth cavities of the device of FIG. 11 may be omitted.

The parameters of an exemplary device are set out in detail below to illustrate the properties and behaviour of the type of devices set out herein.

The exemplary device has a 5 mm useful radius, as may be used in a pair of switchable bifocal spectacle lenses or a security camera. An annular electrode is provided having an outer radius of 5 mm and a width of 0.6 mm. The active area is 79 mm² and the electrode area is 20 mm².

As a voltage is applied to the annular electrode, the adjacent membrane is pulled towards the electrode and the central area is pushed outwards to make a positive lens. The focal length of a spherical lens formed from two materials of different refractive index is given by Equation (1).

$$f = R/(n_1 - n_2) \tag{1}$$

Where f is the lens focal length, R is the radius of curvature of the surface, $n_1$ is the refractive index of the first material and $n_2$ the refractive index of the second fluid.

Clear fluids having densities comparable to water and refractive indices of 1.64 and 1.33 are available, which by the application of equation (1) gives the radius of a 2 dioptre lens (focal length=0.5 m) to be 0.16 m. The surface sag is given by Equation (2).

$$s = R - \sqrt{R^2 - r^2} \tag{2}$$

The sag of the central part of the membrane, in order to produce a 2 dioptre lens, is 78 µm, if the radius of the central zone of the device is 5 mm. The volume of the lens is given by Equation (3).

$$\text{Vol} = \pi Rs^2 \tag{3}$$

The volume calculated using this formula is approximately 3.1 mm³. As this is the same as the volume occupied when the device is at rest, and the membrane is planar, but separated from the electrode, the electrode spacing can be calculated using Equation (4):

$$d = \pi Rs^2 / \pi (r+w)^2 \tag{4}$$

The electrode spacing in this example is 32 microns. The energy stored in a capacitor is a function of the capacitance C and the drive voltage V, and is given by Equations (5) and (6):

$$E = \frac{1}{2} CV^2 \tag{5}$$

where $$C = \varepsilon_r \varepsilon_o A / t \tag{6}$$

$\epsilon_r$ is the relative permittivity of the fluid, $\epsilon_o$ the permittivity of free space, A the area of the capacitor, and t the thickness of the fluid. Since the force applied is the derivative of energy with respect to thickness, the force F can be readily calculated, as shown in Equations 7 and 8.

$$F = \frac{dE}{dt} = \frac{d}{dt}\left(\frac{1}{2}\epsilon_r\epsilon_o AV^2/t\right) \quad (7)$$

$$F = -\epsilon_r\epsilon_o AV^2/t^2 \quad (8)$$

The force exerted increases in inverse square proportion to the local distance between the membrane and the electrode. This can result in instability in the membrane where one area of the electrode is slightly closer to the opposing side due to mechanical tolerances, which area will preferentially pull down. This can be used to effect, by deliberately making one small area slightly thinner and causing the electrodes to close on each other rather like a zipper, when the electrodes are energised.

The force is proportional to the relative permittivity, and as a consequence, it is advantageous to use a non-conductive working fluid with a high relative permittivity. Substituting realistic values, and assuming the driving voltage is 20V, the force on the part of the cell area that is driven is 0.00028N. This is equivalent to a surface pressure of 15 Pa. This pressure increases substantially as the electrode to membrane spacing reduces. The movement of fluid causes the area around the centre of the cell to bow outwards.

To first order, it can be assumed that the central area of the cell becomes spherical in shape. The change is surface area resulting from the distortion from planar to spherical is a non-linear function of the radius of curvature of the central area, shown in Equation (9).

$$\frac{dA}{A} = \frac{R^2}{r_1^2}\left(a\sin\left(\frac{r_1^2}{R^2}\right)\right) - 1 \quad (9)$$

Where A is the electrode area, dA is the change in area, R is the radius of curvature and $r_1$ the radius of the central area. This equation is highly non-linear and the area strain, dA/A, decreases exponentially as the radius of curvature increases. An effect of this is that in the absence of pre-stress in the membrane material (i.e. if there is no tension in the membrane when no voltage is applied), there is no strong restoring force. Pre-stressing the membrane therefore enables it to return to its neutral state more effectively.

Figure 12:
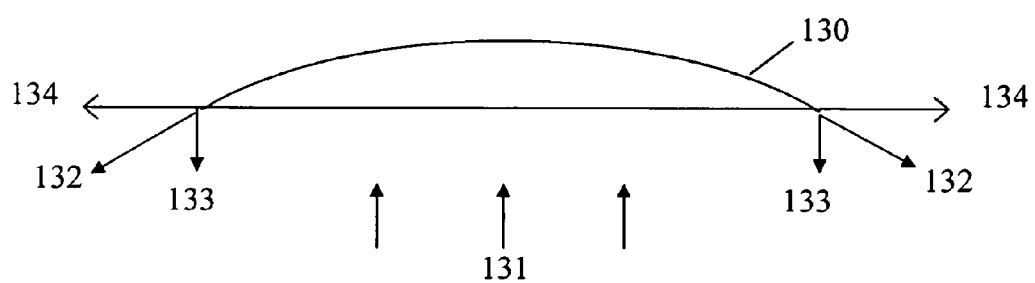
FIG. 12 illustrates the forces acting on the membrane.

In order to bow outwards, the material must elastically extend. According to Hooke's law, the stress exerted by an elastic material is proportional to the strain. FIG. 12 schematically shows the forces acting on the membrane when it is deformed. For the bowed central area of the device 130, the pressure exerted over the surface area of the device 131 is balanced by the stress forces 132 at the rim, where they are resolved into components normal 133 and parallel 134 to the plane of the membrane.

Figure 13:
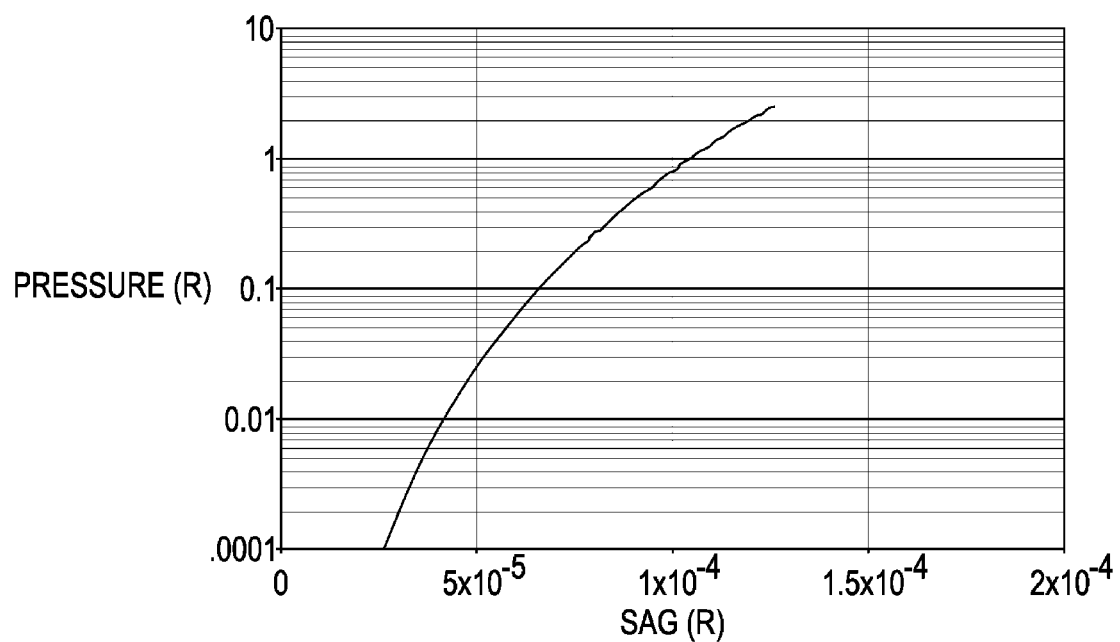
FIG. 13 shows a chart of pressure versus membrane sag.

By balancing the membrane pressure and the restoring elastic stress, the curve shown in FIG. 13 is derived. This shows the relationship between the surface sag, in meters, and the pressure, in Pascals, required to achieve it, as a function of the radius of curvature, R. It is assumed that the membrane is constructed from 20 μm thick polymer. The pressure increases exponentially with surface sag. For a surface sag of 79 μm that is required for 2 dioptre optical power, the pressure is approximately 0.4 Pa.

CONCLUSION

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The terms 'non-conductive' and 'conductive' fluids are used herein to refer to the fluids in the first and second cavities. As will be appreciated by the skilled person the performance of the device will be dependent upon the relative conductivities of the two fluids and those fluids do not need to be perfectly non-conductive or conductive. By selecting appropriate conductivities, the behaviour of the device in response to applied voltages can be varied. For example, the better the conductivity of the second fluid the faster the device may respond to an applied voltage.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A device, comprising:
   a first cavity containing a first fluid and a second cavity containing a second fluid, the first and second cavities being separated by a flexible membrane,
   a first electrode positioned in the first cavity,
   a second electrode providing an electrical contact to the second fluid, wherein
   the first fluid is non-conductive and the second fluid is conductive.

2. A device according to claim 1, wherein the first electrode comprises an annulus.

3. A device according to claim 1, wherein the second electrode is located on a wall of the second cavity.

4. A device according to claim 1, wherein the membrane and at least one wall defining the first cavity and at least one wall defining the second cavity are substantially transparent.

5. A device according to claim 1, wherein the first and second fluids have different refractive indices.

6. A device according to claim 1, wherein the first and second fluids are substantially transparent.

7. A device according to claim 1, wherein the first or second fluid is selected to attenuate one or more wavelengths of light.

8. A device according to claim 1, wherein a wall of the first cavity and a wall of the second cavity comprise second and third flexible membranes respectively.

9. A device according to claim 8, further comprising a third cavity having the second membrane as at least a part of a wall of the third cavity and a fourth cavity having the third membrane as at least a part of a wall of the fourth cavity.

10. A device according to claim 9, wherein each of the third and fourth cavities has at least one one-way fluid inlet and at least one one-way fluid outlet.

11. A device array comprising a plurality of devices according to claim 1.

12. An optical display comprising a plurality of devices according to claim 1.

13. A device according to claim 1, further comprising a third electrode positioned in the first cavity, the third electrode being electrically independent of the first electrode.

14. A device according to claim 1, wherein the second fluid comprises brine.

15. A device according to claim 1 wherein the first fluid comprises a siloxane.

16. A device according to claim 1 wherein a density of the first and second fluids is the same.

17. An optical device, comprising:
a first cavity and a second cavity separated by a flexible membrane, the first cavity and the second cavity containing fluids having different refractive indices,
a first electrode located in the first cavity and a second electrode located in the second cavity, wherein a focal length of the optical device is controlled by application of a voltage between the first electrode and the second electrode to form an electrostatic charge on the flexible membrane and cause movement of the flexible membrane towards the first electrode.

18. An optical device according to claim 17, wherein the first electrode is insulated from the flexible membrane by the first fluid.

19. An optical device according to claim 17, wherein the first and second cavities are sealed such that there is no interchange of the first and second fluids.

20. An optical device according to claim 17, further comprising a third electrode positioned in the first cavity, the third electrode to be driven in sequence with the first electrode.

* * * * *